United States Patent
Senga

(10) Patent No.: US 7,738,410 B2
(45) Date of Patent: Jun. 15, 2010

(54) SERVER APPARATUS, COMMUNICATION SYSTEM, AND PAGING EXECUTION METHOD

(75) Inventor: Emi Senga, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/392,839

(22) Filed: Feb. 25, 2009

(65) Prior Publication Data

US 2009/0268639 A1 Oct. 29, 2009

(30) Foreign Application Priority Data

Apr. 25, 2008 (JP) ............................. 2008-115893

(51) Int. Cl.
*H04H 20/71* (2008.01)
(52) U.S. Cl. ...................................... 370/312; 455/458
(58) Field of Classification Search ................ 379/170, 379/217.9, 217; 340/426.21, 7.1, 7.2, 7.21, 340/7.28, 311.2, 825.44, 311.1; 455/31.2, 455/426.1, 458, 515, 426; 370/312
See application file for complete search history.

(56) References Cited

U.S. PATENT DOCUMENTS 7,180,857 B2 * 2/2007 Kawakami et al. .......... 370/231

2007/0115925 A1 * 5/2007 Sachnoff .................... 370/352
2008/0051116 A1 * 2/2008 Willey ......................... 455/458

FOREIGN PATENT DOCUMENTS

| JP | 64-82715 | 3/1989 |
|---|---|---|
| JP | 9-153945 | 6/1997 |
| JP | 11-69402 | 3/1999 |
| JP | 2003-076769 | 3/2003 |
| JP | 2006-345132 | 12/2006 |

OTHER PUBLICATIONS

Notice of Reasons for Rejection with English translation in a corresponding application, application No. 2008-115893 dated Apr. 20, 2009.

* cited by examiner

*Primary Examiner*—Huy D Vu
*Assistant Examiner*—Adnan Baig
(74) *Attorney, Agent, or Firm*—Blakely, Sokoloff, Taylor & Zafman LLP

(57) ABSTRACT

According to one embodiment, a server apparatus includes a storage module stores information to execute paging of which the broadcast is not completed yet for paging using the recording module, a determination module determines whether or not to execute paging of information in which a paging request has been already recorded in the recording module, a detector detects a storage information amount of the paging stored in the storage module, and a report module reports the storage information amount detected by the detector to a terminal of a paging request origin.

5 Claims, 4 Drawing Sheets

| Paging group number | Device to be paged |
|---|---|
| 1 | IP telephone set 3-3, IP telephone set 3-4, External paging device 4-1 |
| 2 | External paging device 4-2, External paging device 4-3 |
| 3 | Sub-group A (IP telephone set 3-1, IP telephone set 3-2), Sub-group B (IP telephone set 3-3) |
| ⋮ | ⋮ |

F I G. 3

| Device | Idle/busy state |
|---|---|
| IP telephone set 3-1 | Idle |
| IP telephone set 3-2 | Busy |
| ⋮ | ⋮ |
| External paging device 4-1 | Busy |
| External paging device 4-2 | Busy |
| ⋮ | ⋮ |

F I G. 4

| Paging group number | The number of items of storage | Management number of resource for storage, or voice file number | Situation | Paging transmission terminal |
|---|---|---|---|---|
| 1 | 3 | 131 | Under broadcast | IP telephone set 3-6 |
| | | 25 | Under waiting for broadcast | IP telephone set 3-7 |
| | | 151 | Under storage | IP telephone set 3-5 |
| 2 | 2 | 18 | Under broadcast | IP telephone set 3-5 |
| | | 143 | Under waiting for broadcast | IP telephone set 3-6 |
| ⋮ | | ⋮ | | |

F I G. 5

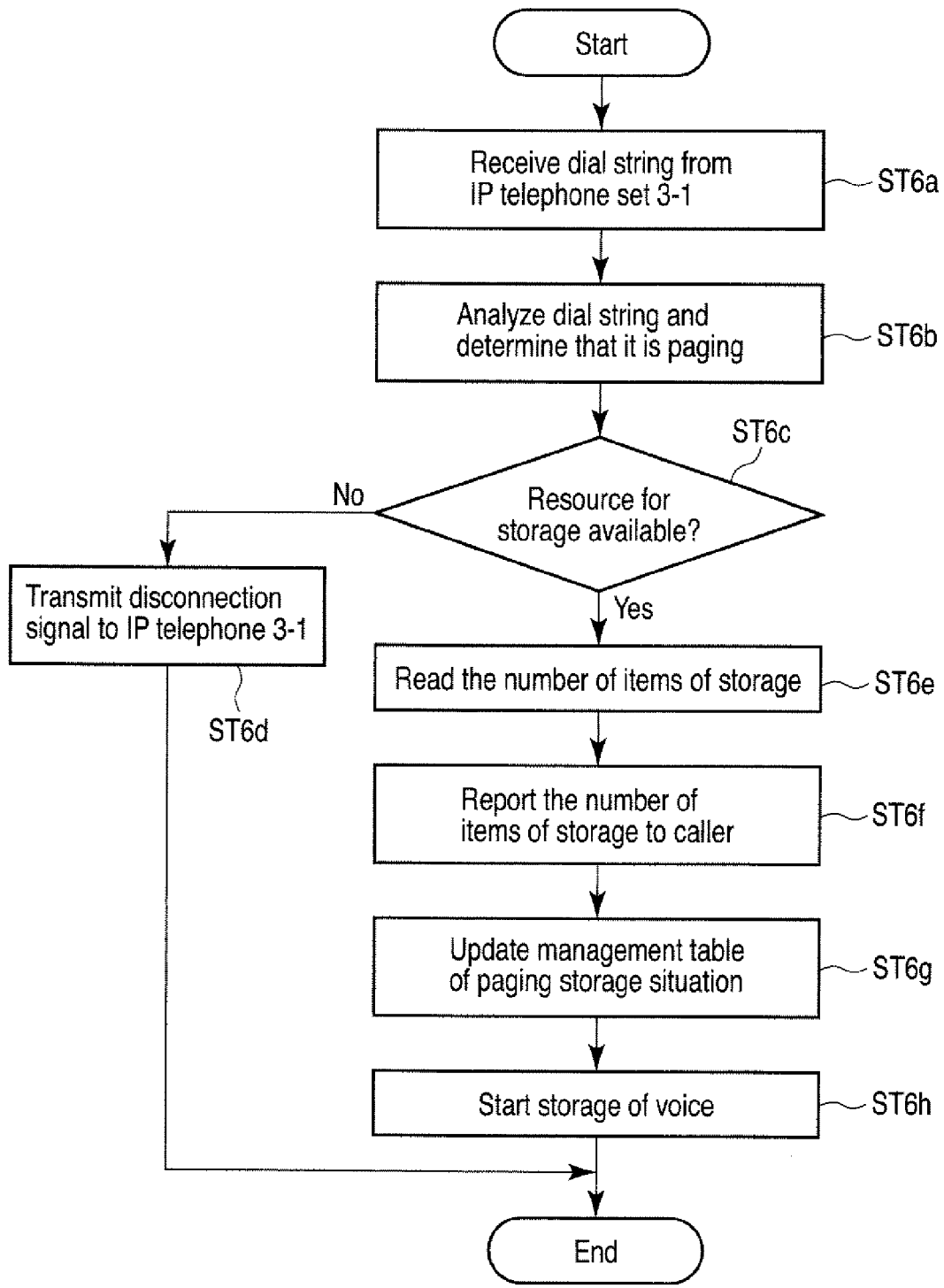
F I G. 6

US 7,738,410 B2

SERVER APPARATUS, COMMUNICATION SYSTEM, AND PAGING EXECUTION METHOD

CROSS-REFERENCE TO RELATED APPLICATIONS

This application is based upon and claims the benefit of priority from Japanese Patent Application No. 2008-115893, filed Apr. 25, 2008, the entire contents of which are incorporated herein by reference.

BACKGROUND

1. Field

One embodiment of the invention relates to a server apparatus, a communication system, and a paging execution method which executes paging so as to broadcast information including at least one of images and voices to a plurality of telephone terminals.

2. Description of the Related Art

A telephone system includes a paging function. The paging function is a function of broadcasting voice signals from a certain telephone terminal to devices such as a plurality of telephone terminals or loud-speakers.

As regards a technique similar to the technique of this kind, a system, which an exchanger inquires, to a pager terminal of a callee, whether a voice signal can terminate to the pager terminal in accordance with pager calling from a caller, and if it is impossible for the voice signal to be terminated, the exchange apparatus reports the fact to the caller, is proposed (e.g., Jpn. Pat. Appln. KOKAI Publication No. 11-69402).

Meanwhile, a paging function may include a system which once stores voices and images to send to a device to be paged and then broadcasts the stored voices and images. Another paging function may include a system which pages pre-recorded voices and images.

Some of these systems enable many callers to perform calling operations for paging almost at the same time. In such systems, since there are some possibilities that the systems have been broadcasting voices and images from other callers at the time when the calling operations are completed, the systems may not broadcast the voices and images just after the completion of the calling operations.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary view depicting a correspondence table among paging group numbers and devices to be paged shown in FIG. 2;

FIG. 4 is an exemplary view depicting a device idle/busy state management table shown in FIG. 2;

FIG. 5 is an exemplary view depicting a paging storage situation management table shown in FIG. 2;

FIG. 6 is an exemplary flowchart depicting a control processing procedure for storing paging voices from the call control server of the first embodiment of the invention.

DETAILED DESCRIPTION

Various embodiments according to the invention will be described hereinafter with reference to the accompanying drawings, in general, according to one embodiment of the invention, a server apparatus which executes paging to broadcast, to a plurality of telephone terminals, information including at least one of images and voices recorded in a recording module, comprising: a storage module configured to store information to execute paging of which the broadcast is not completed yet for paging using the recording module; a determination module configured to determine whether or not to execute paging of information in which a paging request is already recorded in the recording module when the paging request using the recording module is made; a detector which detects a storage information amount of the paging stored in the storage module when the determination module determines that paging of information already recorded in the recording module to be executed, and detects the storage information amount of the paging stored in the storage module when the information is recordable in the recording module if the determination module determines that paging of information not recorded yet in the recording module to be executed; and a report module configured to report the storage information amount detected by the detector to a terminal of a paging request origin when the determination module determines to execute paging of the information already recorded in the recording module, and report the storage information amount detected by the detector to the terminal of the paging request origin at a time of a start of storage of the information in the recording module when the determination module determines to execute the paging of the information not recorded yet in the recording module.

First Embodiment

Figure 1:
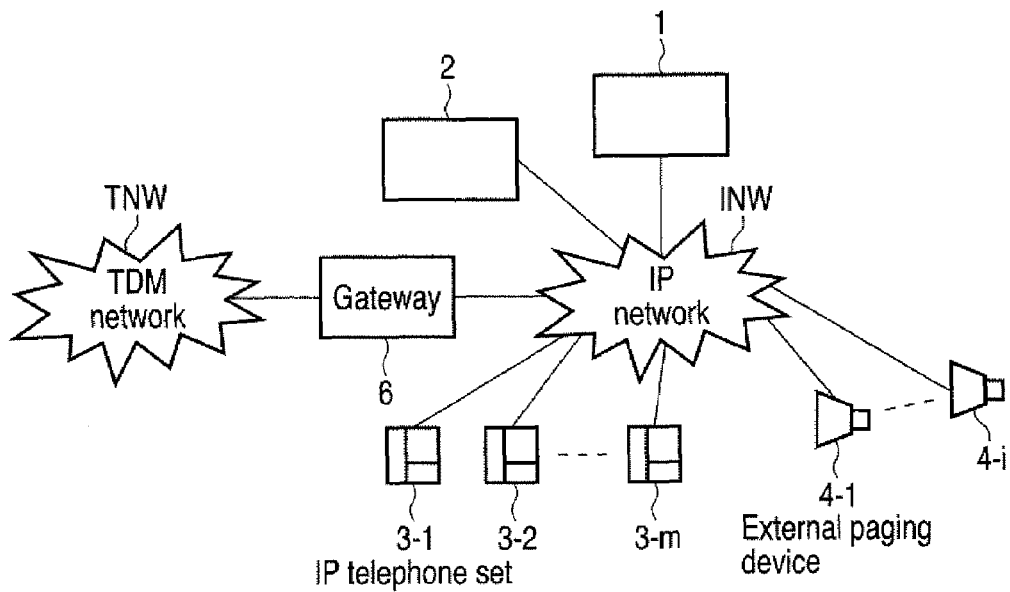
FIG. 1 is an exemplary schematic configuration view depicting a telephone system of a first embodiment of the invention.

FIG. 1 shows a schematic configuration view depicting a telephone system of a first embodiment of the invention.

The telephone system includes an Internet Protocol (IP) network INW. A call control server 1, a media server 2, a plurality of IP telephone sets 3-1 to 3-*m* (m is a natural number), and external paging devices 4-1 to 4-*i* (i is a natural number) are connected to the IP network INW. The IP telephone sets 3-1 to 3-*m* each include communication processing functions and media information processing functions.

A gateway 6 is connected to the IP network INW. The gateway 6 connects between the IP network INW and a time division multiplex (TDM) network TNW, and includes a conversion function of a communication protocol and a signal format between the IP network INW and the TDM network TNW.

The call control server 1 is provided with an exchange control function among the plurality of IP telephone sets 3-1 to 3-*m* and the external paging devices 4-1 to 4-*i*, and also provided with a function of executing paging so as to broadcast information including images and/or voices recorded in the media server 2 to the plurality of IP telephone sets 3-1 to 3-*m* and the external paging devices 4-1 to 4-*i*.

Figure 2:
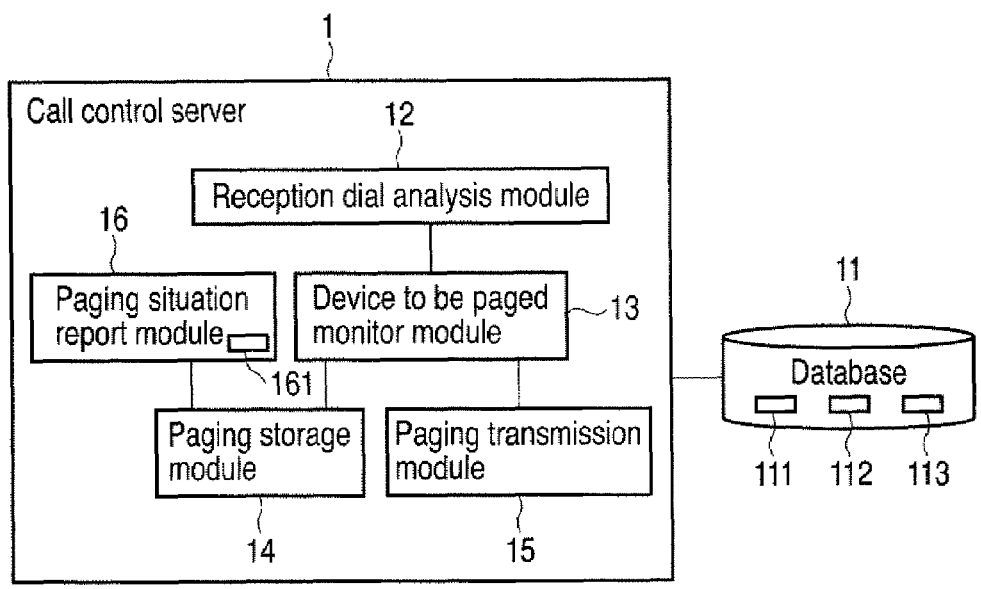
FIG. 2 is an exemplary block diagram depicting a functional configuration of a call control server shown in FIG. 1.

The call control server 1 includes the following functions as functions of the invention. FIG. 2 shows a block diagram depicting the configurations.

That is, the call control server 1 composed of a database 11, a reception dial analysis module 12 (referred to as an analysis module 12), a device to be paged monitor module 13 (referred to as a monitor module 13), a paging storage module 14, a paging transmission module 15, and a paging situation report module 16 (referred to a report module 16).

The database 11 includes tables 111-113. The table 111 is a table showing the correspondence of the paging group numbers and the devices to be paged as shown in FIG. 3.

The table 112 is a device idle/busy management table shown in FIG. 4.

The table 113 is a paging storage situation management table shown in FIG. 5.

The analysis module 12 determines that the calling is paging transmission to the paging group 1 in accordance with a calling dial string received, for example, from the IP telephone set 3-1. In this case, if the dial string is a combination of a paging transmission specified number and a paging group number, the analysis module 12 determines that the call control server 1 transmits the paging of the voice to be recorded in the media server 2 from now. If the dial string is a combination of a paging transmission specified number, a paging group number, and a voice file number, the analysis module 12 determines that the call control server 1 transmits the paging of the voice already recorded in the media server 2.

The monitor module 13 refers to the tables 111, 112 and checks whether or not devices to be paged in the paging group 1 may lie idle. If no device to be paged in the paging group 1 lies idle, the paging storage module 14 captures a resource for storage of the media server 2. If the paging storage module 14 cannot capture the resource for storage, the paging transmission module 15 transmits the fact of disconnection to the IP telephone set 3-1, and reports, to a user A of the IP telephone set 3-1, the fact that the paging cannot be executed. If the paging storage module 14 can capture the resource for storage, the paging transmission module 15 transmits a response signal to the IP telephone set 3-1.

At this moment, the report module 16 refers to the table 113 by means of the number of items of storage detection module 161, detects the number of items of the storage of paging in order to broadcast to the paging group 1, and transmits the number of items of storage to the IP telephone set 3-1. In the first embodiment, the order of broadcast of the paging is the same as the order of the storage of the paging.

The paging storage module 14 updates (adds +1 to the number of items of storage in the paging group 1, and registers the management number of the resource for storage, the paging transmission terminal information, and the situation [under storage]) the table 113, and starts storage of voices.

The paging transmission module 15 refers to the table 113 and broadcasts the stored paging in turn.

The following will describe operations of the system configured as mentioned above.

FIG. 6 shows a flowchart depicting a control processing procedure when the call control server 1 stores the paging voices.

For instance, it is assumed that the user A of the IP telephone set 3-1 starts voice paging operations for the paging group 1. In this case, the user A dials a paging transmission specified number and a paging group number (=1) through the IP telephone set 3-1 and presses a "Start" key. Then, the IP telephone set 3-1 transmits the dial string to the call control server 1.

The call control server 1 makes a shift from Block ST6*a* to Block ST6*b* depending of the dial string received from the IP telephone set 3-1 and determines to perform the paging transmission of the voice to be record in the media server 2 for the paging transmission to the paging group 1.

The call control server 1 refers to the tables 111, 112, checks whether or not the devices to be paged in the paging group 1 lie idle, and if the devices to be paged do not lie idle, determines whether or not the resource for storage in the media server 2 is available (Block ST6*c*). Also in a case in which it is preset so as to page in a certain broadcast time in advance, the call control server 1 determines whether or not the resource for storage in the media server 2 is available.

Here, if the resource for storage cannot be captured (No, Block ST6*c*), the call control server 1 transmits a message of the fact of disconnection to the IP telephone set 3-1, and reports, to the user A, the fact that the paging cannot be executed (Block ST6*d*).

Conversely, if the resource for storage can be captured (Yes, Block ST6*c*), the call control server 1 transmits a response signal to the IP telephone set 3-1. At this moment, the call control server 1 refers to the table 113 (Block ST6*e*), transmits the number of items of storage to the IP telephone set 3-1, and display the number on an LCD (Block ST6*f*).

The call control server 1 updates (adds +1 to the number of items of storage in the paging group 1, registers the management number of the resource for storage, the paging transmission terminal information, and the situation [under storage]) (Block ST6*g*), and starts the storage of the voices (Block ST6*h*).

The IP telephone set 3-1 displays the number of items of storage included in the response signal received from the call control server 1 on the LCD of the IP telephone set 3-1 together with the fact of the start of the storage of the voices. When the user A desires to continue the paging transmission operations, the user A performs the storage completion operation (the press operation of the "#" button of the IP telephone set 3-1) after storing the voices. If the user A places the IP telephone set 3-1 in the on-hook state without performing the storage completion operation, the call control server 1 performs stop processing of the paging transmission.

As mentioned above, in the first embodiment, the call control server 1 updates the number of items of storage of the table 113 for every paging transmission. When a paging request using the media server 2 is made and when the resource for storage of the media server 2 can be captured, the call control server 1 refers to the table 113 of the database 11, reads the number of items of storage in the paging group 1, and reports the read number of items of storage to the IP telephone set 3-1 of the paging request origin at the time of start of the storage in the media server 2.

Therefore, the user performing the paging transmission may easily recognize the congestion situation of the paging. At this moment, since the system does not automatically stop paging, the system may select whether or not to stop the paging by means of the operation of the caller.

Second Embodiment

A second embodiment of the invention reports the number of items of storage to a caller of paging in a system which pages voices recorded in the media server 2 in advance.

Voice files recorded in advance are stored in the media server 2 and given numbers. Upon paging transmission, the caller dials the paging transmission specified number, the paging group number (=1), and the number of the voice file.

The paging storage module 14 updates the table 113, however does not capture the resource for storage in the media server 2.

The IP telephone set 3-1 displays the number of items of storage included in the response signal received from the call control server 1 on the LCD of the telephone set 3-1 together with the display of the paging reception completion.

In this way, in the second embodiment, when the voice already recorded in the media server 2 is transmitted in a paging manner, the call control server 1 reads the number of items of storage in the paging group, and reports the read number of items of storage to the IP telephone set 3-1 of the paging request origin.

Accordingly, the user performing the paging transmission may easily recognize the busy situation of the paging, and select whether or not to stop the paging of the voice already recorded in the media server 2.

Third Embodiment

In a third embodiment of the invention, the communication system which pages the voice recorded in the media server 2 in advance confirms for the caller whether or not to perform the paging when the number of items of storage exceeds a prescribed threshold.

The threshold of the number of items of storage is stored in the database 11 in advance (it is assumed that the threshold is set in the table of the database 11 for each paging transmission terminal).

When transmitting the response signal to the IP telephone set 3-1, the call control server 1 reports the information whether or not to confirm paging implementation together with the number of items of storage (in a case in which the number of items of storage exceeds the threshold, the server 1 reports that the conformation of the paging implementation should be performed).

When it is reported that the confirmation of the paging implementation should be performed, the IP telephone set 3-1 displays the selection screen whether or not to perform the paging as well as to display the number of items of storage on the LCD of the IP telephone set 3-1. The IP telephone set 3-1 reports the result of the selection by the caller to the call control server 1.

The call control server 1 performs processing of paging reception or paging cancellation in accordance with the result of the selection by the caller, and transmits a completion report signal of the paging reception or paging cancellation to the IP telephone set 3-1.

The IP telephone set 3-1 displays the completion of the paging reception or paging cancellation.

Fourth Embodiment

Figure 7:
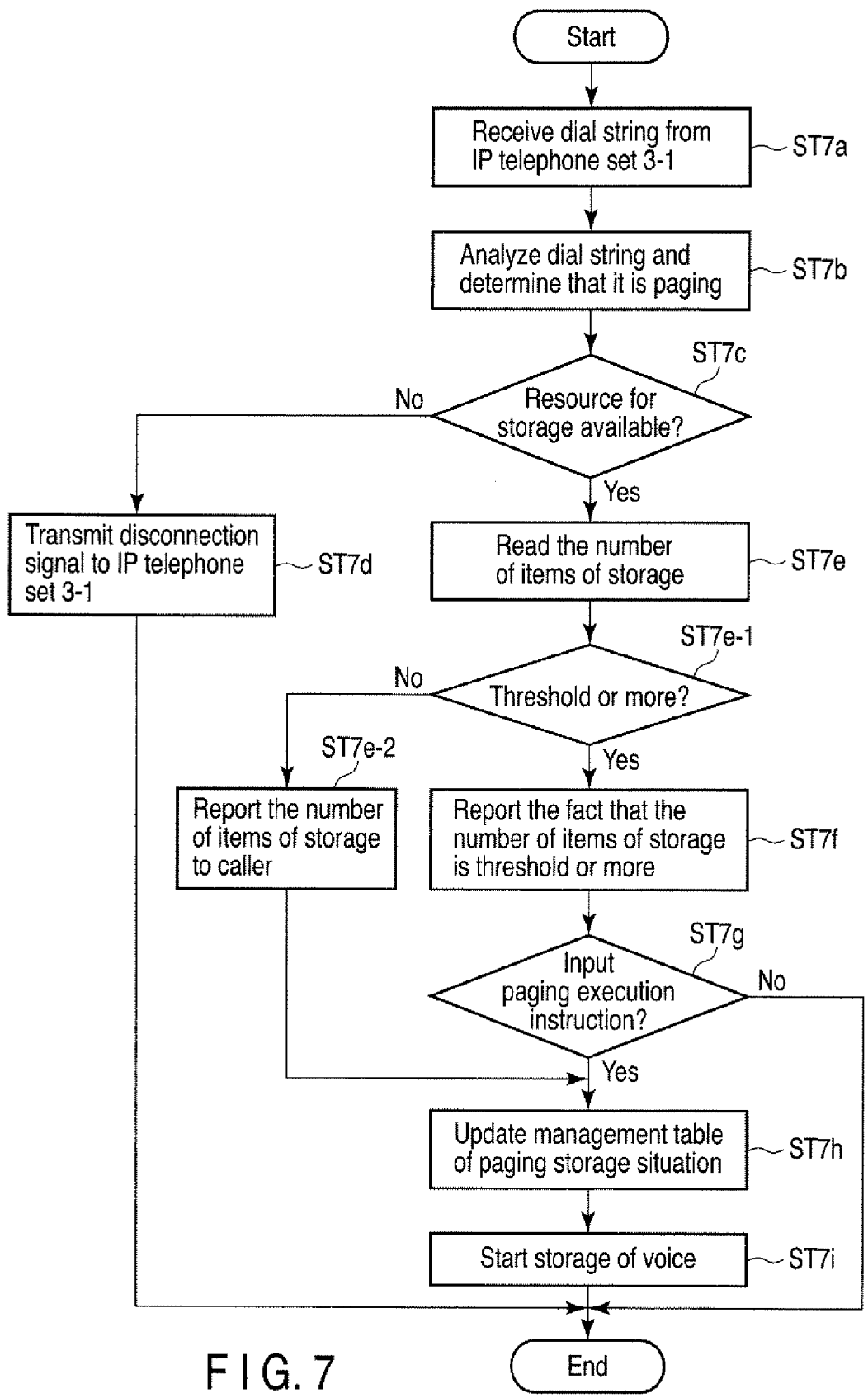
FIG. 7 is an exemplary flowchart depicting a control processing procedure for storing paging voices from the call control server of a fourth embodiment of the invention.

FIG. 7 shows a flowchart depicting a control processing procedure when the call control server 1 stores the voice, as a fourth embodiment of the invention.

For instance, it is assumed that the user A of the IP telephone set 3-1 starts paging voice operations to the paging group 1. In this case, the user A dials the paging transmission specified number and the paging group number (=1) through the IP telephone set 3-1, and presses the "Start" key. Then, the IP telephone set 3-1 transmits the dial string to the call control server 1.

The call control server 1 makes a shift from Block ST7*a* to Block ST7*b* depending on the dial string received from the IP telephone set 3-1, and determines to make the paging transmission of the voice in order to record the voice in the media server 2 through the paging transmission to the paging group 1.

The call control server 1 refers to the tables 111, 112, check whether or not the devices to be paged in the paging group 1 lie idle, and if the devices to be paged in the paging group 1 do not lie idle, determines whether or not the resource for storage in the media server 2 is available (Block ST7*c*).

Here, if the resource for storage cannot be captured (No, Block ST7*c*), the call control server 1 transmits, to the IP telephone set 3-1, the message of the disconnection (Block ST7*d*).

Conversely, if the resource for storage can be captured (Yes, Block ST7*c*), the call control server 1 transmits the response signal to the IP telephone set 3-1. At this moment, the call control server 1 refers to the table 113 (Block ST7*e*), and determines whether or not the number of items of storage exceeds the prescribed threshold on the basis of the reference result (Block ST7*e*-1). If it is determined that the number exceeds the threshold (Yes, Block ST7*e*-1), the call control server 1 transmits a message of "confirmation of paging implementation is performed" to the IP telephone set 3-1 and displays the message on the LCD (Block ST7*f*). Therefore, the user A can recognize in real time the fact that the number of items of storage in the paging group 1 exceeds the threshold depending on this display.

In this state, it is assumed that the user A inputs a paging execution instruction in the IP telephone set 3-1 so as to execute the paging. The call control server 1 then shifts from Block ST7*g* to Block ST7*h*, updates (increases the number of items of the storage in the paging group 1 by one, registers the management number of the resource for management, paging transmission terminal information, situation [under storage]) the table 113, and starts storage of voice (Block ST7*i*).

In Block ST7*g*, if the user A does not input the paging execution instruction after the elapse of a fixed time period, the call control server 1 terminates the processing. If it is determined that the number of items of storage is less than the threshold (No, Block ST7*e*-1), the call control server 1 returns the number of items of storage to the IP telephone set 3-1, and display the number on the LCD (Block ST7*e*-2).

As described above, in the fourth embodiment, if the number of items of storage exceeds the threshold, the call control server 1 displays a message of "paging execution is confirmed" on the LCD of the IP telephone set 3-1, and executes paging of the voice stored in the media server 2 after the instruction from the user A is issued. Thereby, it is not necessary for the user A of the IP telephone set 3-1 to execute the paging when the user A has no need to execute the paging in accordance with the displayed number of items of storage.

Other Embodiment

The invention is not limited to the aforementioned embodiments. For instance, in the fourth embodiment, if the number of items of storage exceeds the threshold, the call control server 1 once reports the message of "paging execution is confirmed" to the user A.

However, the invention is not limited to this configuration; the paging may be cancelled at the time when the number of items of storage exceeds a certain threshold.

Both the modes for executing paging after the input of the paging execution instruction from the user A when the number of items of the storage and for automatically canceling the paging at the time when the number of items of storage exceeds a certain threshold may be prepared, and the modes may be selectively operated in accordance with a selective instruction from the user A. Thereby, for example, with the mode for each threshold set, optimum paging for each threshold may be executed in such a way that the paging is executed only when it is determined that the paging is necessary by a user it self of a paging request origin if the number of items of storage exceeds five and a way that the paging is automatically stopped, for example, when the number of items of storage exceeds 10.

While each of the aforementioned embodiments has been described the example in which the processing is shared by the call control server 1 and the media server 2, the processing may be executed only by the call control server 1. Further, while each of the embodiments given above has been described the example in which a process for incrementing the number of items of storage is performed at every time when the paging is required, in a case, for example, only the call control server 1 performs the processing, the number of items of storage may be directly detected from the memory for recording the voice. Paging of images as well as paging of voices may be executed.

While each of the foregoing embodiments has been described the example in which the number of items of storage of images or voices of paging of which the broadcast have not completed yet, the invention is not limited to the example, a total value of a broadcast hours of the images and/or voices may be detected.

Further, while each of the foregoing embodiments has been described the example to broadcast in order of the storage of the paging, the invention is not limited to the embodiments, with a high or low priority to a paging request imparted, if the paging request has a high priority, the number of items of storage only of the paging with high priority may be reported to the paging request origin.

Other than this, also as regards the system configuration, various modifications of the functional configurations of the call control servers, the report methods of the number of items of storage of the images and voices for the paging, the paging execution methods, etc., may be made without departing from the substance of the invention.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A server apparatus which executes paging to broadcast, to a plurality of telephone terminals, a first information including at least one of images and voices recorded in a recording module, comprising:
    a storage module configured to store a second information indicating a recording situation for the recording module and a terminal of a paging request origin of the first information which the broadcast is not completed yet for paging using the recording module;
    a determination module configured to determine whether or not to execute paging of the first information in which a paging request is already recorded in the recording module when the paging request using the recording module is made;
    a detector configured to detect a storage information amount of the second information stored in the storage module when the determination module determines that paging of the first information already recorded in the recording module is to be executed, and detect the storage information amount of the second information already stored in the storage module when the first information is recordable in the recording module if the determination module determines that paging of the first information not recorded yet in the recording module is to be executed; and
    a report module configured to report the storage information amount detected by the detector to a terminal of a paging request origin when the determination module determines to execute paging of the first information already recorded in the recording module, and report the storage information amount detected by the detector to the terminal of the paging request origin at a time of a start of storage of the first information in the recording module when the determination module determines to execute the paging of the first information not recorded yet in the recording module; and
    a controller configured to report to the terminal of the paging request origin, when the storage information amount is detected by the detector to exceed a prescribed first threshold, and record the first information in the storage module to execute paging for the recorded information, when a paging instruction is input from the terminal of the paging request origin for the report;
    wherein: the controller comprises:
        a first mode which reports to the terminal of the paging request origin, when the storage information amount is detected by the detector to exceed the prescribed first threshold, and records the first information so as to execute paging on the storage module, when the paging instruction is input from the terminal of the paging request origin for the report; and
        a second mode which automatically stops execution of paging when the storage information amount detected by the detector exceeds a second threshold larger than the first threshold.

2. The apparatus of claim 1, wherein the storage information amount is the number of items for storage for the first information recorded in the recording module.

3. The apparatus of claim 1, wherein the storage information amount is a total value of broadcast hours of the first information recorded in the recording module.

4. A communication system comprising;
    a plurality of terminals connected to a communication network; and
    a server apparatus which is connected to the communication network and executes paging to broadcast, to the plurality of terminals, a first information including at least one of images and voices recorded in a recording module, wherein
    the server apparatus comprises:
    a storage module configured to store a second information indicating a recording situation for the recording module and a terminal of a paging request origin of the first information which the broadcast is not completed yet for paging using the recording module;
    a determination module configured to determine whether or not to execute paging of the first information in which a paging request is already recorded in the recording module when the paging request using the recording module is made;

a detector configured to detect a storage information amount of the second information stored in the storage module when the determination module determines that paging of the first information already recorded in the recording module is to be executed, and detect the storage information amount of the second information already stored in the storage module when the first information is recordable in the recording module if the determination module determines to execute paging of the first information not recorded yet in the recording module;

a report module configured to report the storage information amount detected by the detector to a terminal of a paging request origin when the determination module determines to execute paging of the first information already recorded in the recording module, and report the storage information amount detected by the detector to the terminal of the paging request origin at a time of a start of storage of the first information in the storage module when the determination module determines to execute paging of the first information not recorded yet in the recording module; and a controller configured to report to the terminal of the paging request origin when the storage information amount is detected by the detector to exceed a prescribed first threshold, and record the first information in the storage module to execute paging for the recorded information, when a paging instruction is input from the terminal of the paging request origin for the report;

wherein: the controller comprises:

a first mode which reports to the terminal of the paging request origin when the storage information amount is detected by the detector to exceed the prescribed first threshold, and records the first information so as to execute paging on the storage module, when the paging instruction is input from the terminal of the paging request origin for the report; and a second mode which automatically stops execution of paging when the storage information amount detected by the detector exceeds a second threshold larger than the first threshold.

5. A paging execution method for use in a server apparatus which executes paging to broadcast, to a plurality of telephone terminals, a first information including at least one of images and voices recorded in a recording module, comprising:

storing a second information indicating a recording situation for the recording module and a terminal of a paging request origin of the first information which the broadcast is not completed yet for paging using the recording module;

determining whether or not a paging request executes paging the first information recorded in the recording module when the paging request using the recording module is made;

detecting a storage information amount of the second information which the broadcast is not completed yet if it is determined to execute paging of the first information already recorded in the recording module;

detecting the storage information amount of the second information which the broadcast is not completed yet when the first information is recordable in the recording module if it is determined to execute paging of the first information not recorded yet in the recording module;

reporting the storage information amount to a terminal of a paging request origin if it is determined to execute paging of the first information already recorded in the recording module;

reporting the storage information amount to the terminal of the paging request origin at a time of a start of storage of the first information in the recording module if it is determined to execute paging of the first information not recorded yet in the recording module; and controlling in order to report to the terminal of the paging request origin when the storage information amount to be detected by the detector exceeds a prescribed first threshold; and recording the first information in the recording module to execute paging for the recorded information, when a paging instruction is input from the terminal of the paging request origin for the report:

wherein the controlling includes a first mode which reports to the terminal of the paging request origin when the detected storage information amount exceeds the prescribed first threshold, and records of the first information so as to execute paging on the storage module, when the paging instruction is input from the terminal of the paging request origin for the report; and a second mode which automatically stops execution of paging when the detected storage information amount exceeds a second threshold larger than the first threshold.

* * * * *